(12) United States Patent
He

(10) Patent No.: US 6,491,985 B2
(45) Date of Patent: Dec. 10, 2002

(54) METHOD FOR ENHANCING THE SURFACE OF A METAL SUBSTRATE

(75) Inventor: Ting He, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 68 days.

(21) Appl. No.: 09/742,697

(22) Filed: Dec. 20, 2000

(65) Prior Publication Data

US 2002/0081251 A1 Jun. 27, 2002

(51) Int. Cl.$^7$ ................................................ C23C 4/04
(52) U.S. Cl. ........................ 427/450; 427/451; 427/453; 427/454; 427/419.2; 502/527.12; 502/527.13
(58) Field of Search ................................ 427/450, 451, 427/453, 454, 226, 419.2; 428/689, 701, 702; 422/168, 171, 173, 198, 190, 187, 177, 211, 180, 222; 502/527.12, 527.13; 165/166, 133, DIG. 394, DIG. 379

(56) References Cited

U.S. PATENT DOCUMENTS 5,326,597 A * 7/1994 Sawada et al. ............ 427/448
5,512,250 A * 4/1996 Betta et al. ................ 422/173

FOREIGN PATENT DOCUMENTS

WO          98/48071       * 10/1998

OTHER PUBLICATIONS

Thermal Spraying: Practice, Theory, and Application, American Welding Society, Inc. 1985, p. 17.*

* cited by examiner

Primary Examiner—Katherine A. Bareford
(74) Attorney, Agent, or Firm—Edwin M. Baranowski; Mark E. Duell

(57) ABSTRACT

A method of treating the surface of a substrate by thermally spraying large size particles, >10 micrometers, of a composition such as a metal hydroxide, carbonate, or nitrate directly onto the substrate whereby a small size particle coating, <5 microns and more particularly <3, is formed on the substrate, enhancing the surface area and porosity properties of the substrate, and substrates with metal oxide surfaces produced thereby.

10 Claims, 4 Drawing Sheets

METHOD FOR ENHANCING THE SURFACE OF A METAL SUBSTRATE

FIELD OF THE INVENTION

The invention relates to a method for enhancing the surface of a substrate and products produced thereby. More particularly the invention relates to a method of treating a substrate by thermally spraying a catalyst precursor material directly onto the substrate surface to increase porosity and surface area, and substrates formed thereby. The invention is particularly useful in treating a metal separator used in a micro-component reaction chamber to form a catalyst surface coating thereon.

BACKGROUND OF THE INVENTION

In the prior art, material coatings typically have been applied to metallic or other surfaces for protective or restorative purposes, such as wear and corrosion resistance, thermal barrier coatings ("TBCs"), protection against oxidation, and dimensional restoration. Coatings made from ceramic materials in particular offer resistance against abrasive wear and thermal shock and provide electrical insulation.

The thermal spray coating process has evolved from a method for patching or repairing material surfaces to a technique enabling surface microstructure design and enhancement. As is known to those skilled in the art, thermal spraying involves any of several methods by which a coating material is placed in the path of a spray jet, heated until the material softens or melts, and propelled to the surface of a prepared substrate to form a deposit. U.S. Pat. No. 5,900,283 to Vakil et al. and U.S. Pat. No. 5,985,368 to Sangeeta et al. describe various methods of depositing a protective coating on a metal-based substrate, including thermal spraying.

Thermal spraying processes include flame spraying and plasma spraying. In each process, the material is impacted as it is deposited on the substrate and is allowed to cool and solidify to form a coating on the substrate. The deformation of the softened or molten material upon impact with the substrate, and, in some cases, the force of the impact, is sufficient for the material to mechanically bond to the surface. In thermal spraying processes, the particles sprayed, upon impact with the substrate surface mechanically lock and/or bond into the profile of the surface.

Initially, thermal spray technology focused on techniques of heating particles into a plastic state before impact to effect bonding with the surface. Methods of high velocity spraying now exist whereby extreme spray velocities are generated. Powder material is injected into a focused gas stream and imparted with enough velocity that the force of impact of particles with the substrate is sufficient to achieve adequate bonding.

Flame spraying and plasma spraying are conventional methods by which coatings are applied. Flame spraying involves the heating and projecting of the coating material through the use of an oxygen fuel flame and pressurized carrier gas jet. Coating material is melted, atomized, or softened as it is fed into the flame, and the soft or molten particulate is ejected in a directed stream through the nozzle of the spray gun toward the substrate. Like flame spraying, plasma spraying also heats and projects particles of a material toward a work surface or substrate. A plasma gun replaces the flame used in older spray systems with a stream of highly ionized inert gas, plasma, and imparts greater velocity to the powder. In the plasma spray system, an electric arc is created and a mixture of combustible gases is ignited to create a high temperature flame. The resulting plasma flame can be pushed forward in front of the gun. When powder is injected into the plasma flame near the front of the plasma spray gun nozzle, the gases expand rapidly, and the resulting velocity of the heated powder particulate propels it to the substrate. In both flame spraying and plasma spraying, large size particles or powders (typically>10 (micrometers) are injected.

Coatings for protective and similar applications are formed by spraying hot powder particles onto a substrate to form coatings with thicknesses ranging from about ten up to hundreds of micrometers. The resulting coating exhibits a relatively dense and smooth, or low-profile, surface with large particle sizes. Thermally sprayed ceramic coatings may exhibit physical characteristics such as a durable, higher profile surface suitable for gripping and anti-skid applications. In applications such as sliding wear situations, in which a smoother surface is required, the coated surfaces may be further refined by grinding and polishing.

Thermally sprayed coatings have a relatively weak bond with the substrate. Internal stresses, especially in thicker coatings, and high stress wear patterns may exceed the bond between the coating and substrate and cause failure. Surface treatments that are known in the art, such as grit blasting, enhance the work surface and provide an anchor profile for the coating so that it will better adhere to the substrate. The resulting high profile coating can be polished or otherwise refined as discussed above to achieve a smooth surface in, for example, protective coating applications.

In the present invention, the thermal spraying process produces on a surface a small particle size and high surface area coating that is desirable in applications where the coating is a catalyst itself, or where the treated surface is a precursor surface for a further coating. The thermal sprayed treated substrate surface requires no further refinement.

A method for applying and forming a thermally sprayed coating on a substrate that yields a thin layer of a catalyst coating with small particle size and high surface area is the desirable object achieved by the present invention. A coating applied to a substrate using thermal spraying techniques in which the coating has mechanical stability and promotes catalytic reactions is yet another object achieved by the present invention Catalytic material has been used as a coating on ceramic or metallic substrates in applications such as, for example, catalytic converters in automobile exhaust systems to reduce the emission of noxious gases. In the prior art, the substrate is typically coated with a catalyst by immersion in a slurry containing the catalytic material. Problems arise in that catalytic material does not adhere as well to a metallic substrate as it does to a ceramic substrate and the coating is not uniformly distributed.

U.S. Pat. No. 5,721,188 to Sung et al. discloses a thermal spray method for adhering a catalytic material to a metal substrate. The disclosed method involves thermally spraying refractory oxide particles onto a substrate for the primary purpose of attaining an undercoat having high surface roughness, and the subsequent application of a separate catalytic material to the undercoated substrate. Refractory oxide powders ranging in average particle size from 13 to 180 microns are thermally sprayed onto the substrate (See, for example, column 3, lines 27–32). Catalytic material is then applied to the undercoated substrate by immersing the substrate in a wash coat slurry containing the catalytic material. The coated substrate is then dried and calcined (Id., column 4, lines 30–35). Sung et al. recognized the need for a method to improve the adhesion between metallic substrates and catalytic materials disposed thereon (Ibid., column 1, lines 29–31) but do not propose a method for adhering a catalytic material directly to a metallic substrate.

SUMMARY OF THE INVENTION

The present invention provides a method of coating a substrate such that the coating bonds directly with the surface of the substrate. Characteristics of the thermally sprayed coating, including high porosity, high surface profile and surface area, and small particle size, are beneficially achieved in the application of the present invention. In the method of the present invention, a catalyst precursor material such as a powder having a large particle size, for example, greater than 10 micrometers, is thermally sprayed onto the substrate and forms a catalyst coating that bonds to the substrate surface. The coating is formed from decomposition products of the sprayed material having small particle size, namely in the order of less than approximately 5 microns, and more specifically in the order of less than approximately 3 microns. The substrate may in turn be coated with a further coating of a catalytic material. In a useful embodiment, the coated substrate is used as a separator between alternate fluid flows in a micro-component reaction chamber, or heat exchanger, and the coating acts as a catalyst to promote a chemical reaction in a fluid flowing over the substrate in the chamber.

In one embodiment, the present method is applied to form a catalyst coating on a separator element in a micro-component heat exchanger such as that described in United States application for U.S. Pat. No. 09/627,267 filed on Jul. 28, 2000, entitled "Multi-purpose Micro-channel Micro-component," the disclosure of which is hereby incorporated by reference. The catalyst material formed in the thermal spray promotes a chemical reaction when a reagent fluid flows through the channels of the micro-component device. One or both sides of the separator may be treated. In this aspect of the invention, the coating, and the enhanced surface properties thereof, also assist in the transfer of heat between facing channels in the micro-component device.

In another embodiment, the method of the present invention comprises thermally spraying aluminum hydroxide particles onto a metal substrate. In yet another embodiment, the method may comprise thermally spraying catalyst precursor material onto a surface, or oppositely facing surfaces of a metallic substrate. In the invention, a large size powder of a precursor material is flame sprayed or plasma sprayed onto a substrate to produce a small particle size coating by the pyrolysis process, i.e., the decomposition by heat of the sprayed material.

Before treatment in accordance with the invention, the substrate surface may be enhanced by methods such as grit blasting to improve adhesion of the thermally sprayed coating to the substrate.

The invention is described more fully in the following description of the preferred embodiment considered in view of the drawings in which:

DETAILED DESCRIPTION OF THE INVENTION AND THE PREFERRED EMBODIMENT

Figure 1:
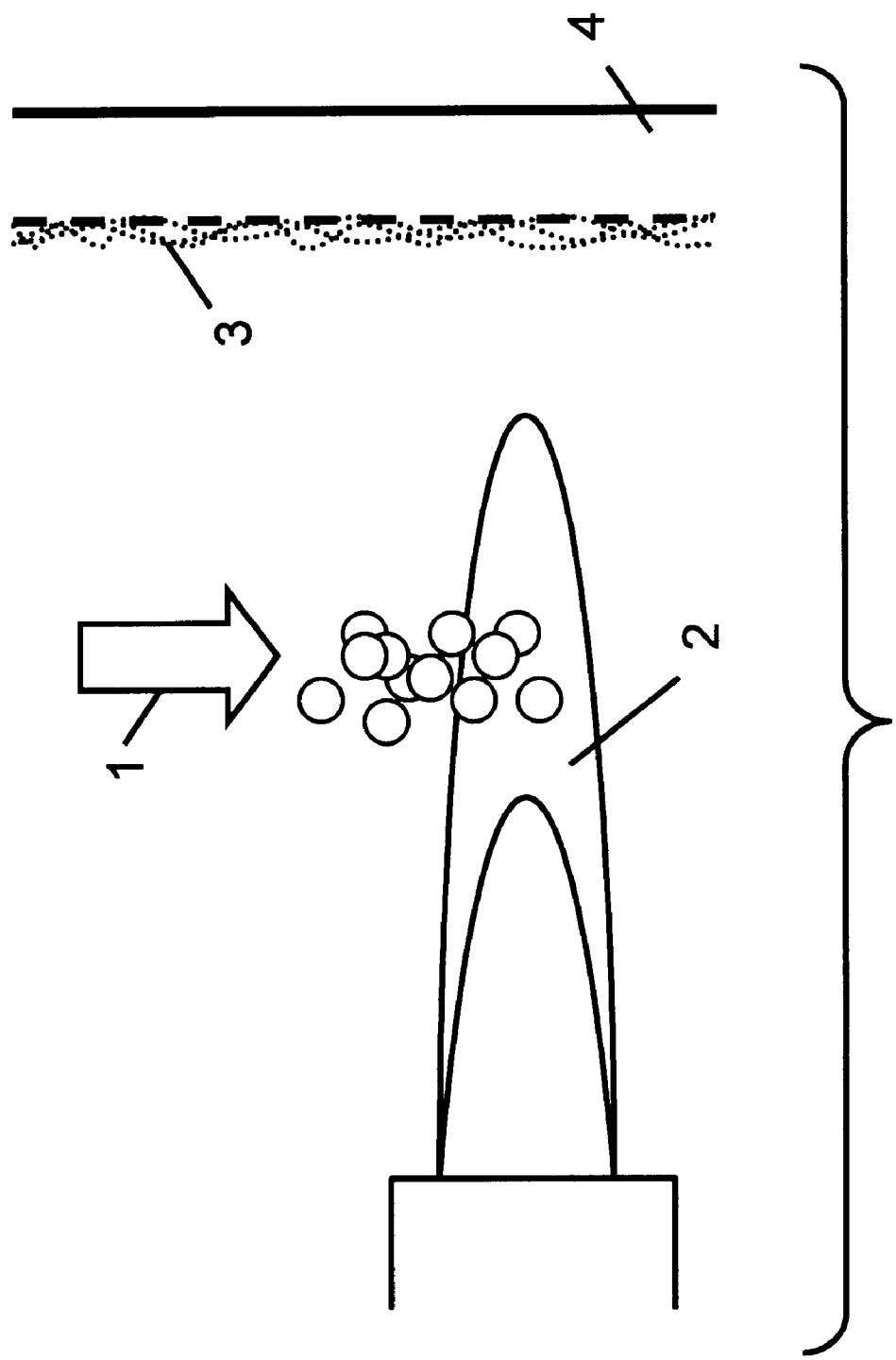
FIG. 1 shows a representation of the thermal spray process (not to scale) in which a powder is introduced into a flame or plasma directed to a substrate surface.

The present invention relates generally to a method for forming a catalyst coating directly on a metallic substrate. FIG. 1 shows a representation of the thermal spray process used in the invention. A powder material 1 is introduced into a flame or plasma 2 that is directed to the surface 3 of a substrate 4. A coating results which provides a porous, or enhanced surface area, on the substrate surface, which may in turn be coated with a further catalyst material such as a noble metal. Metal hydroxide, carbonate and nitrate materials are used in the invention with thermal spray processes to coat metallic substrates and increase porosity and surface area. In a line of sight thermal spray, the materials decompose and oxidize by pyrolysis and produce oxides that adhere to the substrate surface. The typical reactions, $Me(OH)_x \rightarrow MeO_x + H_2O$ in the instance of metal hydroxides; $Me(CO_3)_x \rightarrow MeO_x + CO_2$ in the instance of metal carbonates, and $Me(NO_3)_x \rightarrow MeO_x + N_2O$ in the instance of metal nitrates, occur in the thermal spray process. The method treats a surface of a substrate by thermally spraying large size particles, >10 micrometers, of a composition such as a metal hydroxide, carbonate, or nitrate directly onto the substrate whereby a coating of small size particles, <5 microns, and more particularly <3 microns, is formed on the substrate. The surface area and porosity properties of the substrate are enhanced. Substrates with metal oxide surfaces produced by the method are useful as catalyst materials, particularly in micro-component assemblies.

Figure 2:
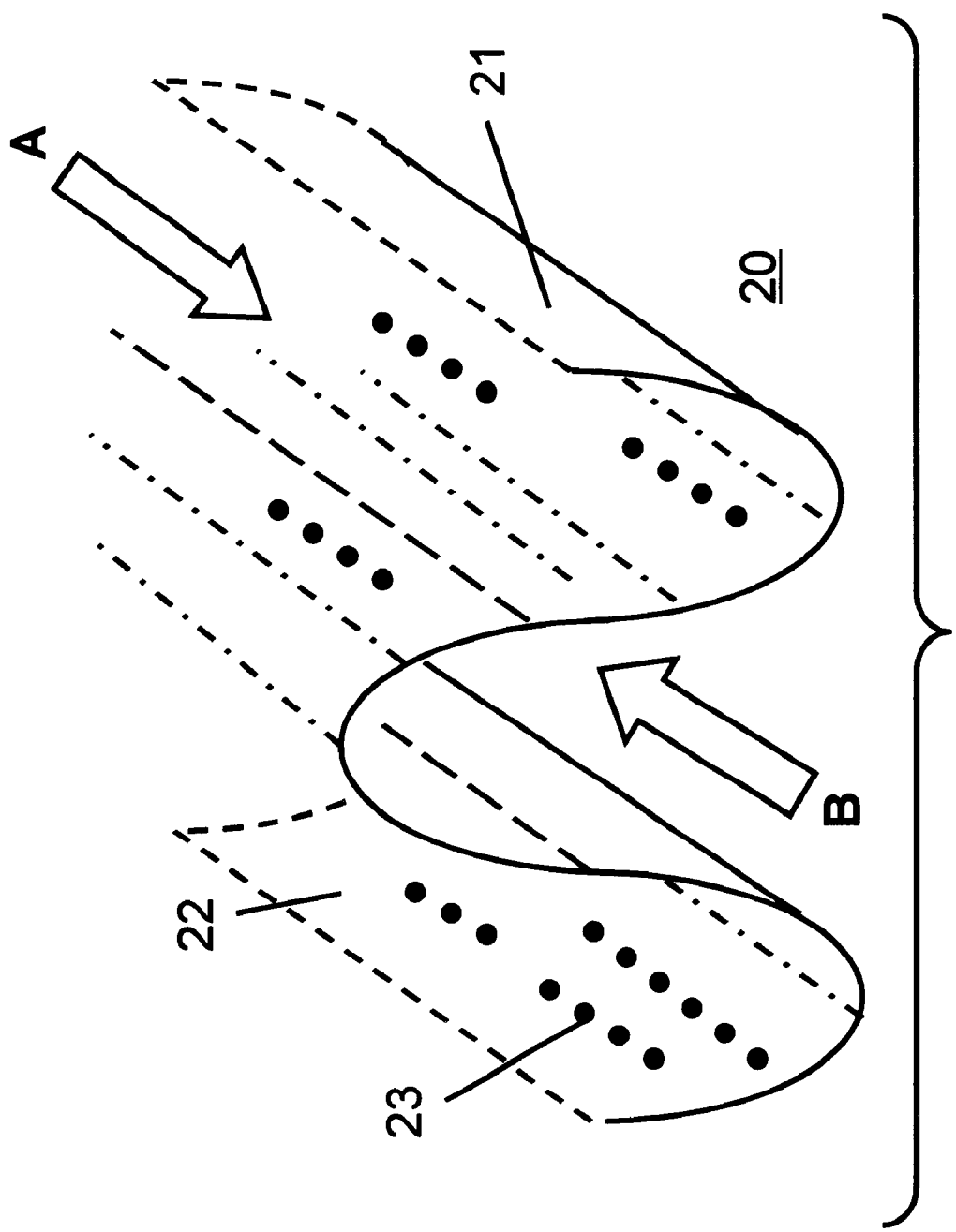
FIG. 2 represents a section of a steam reformer/heat exchange reaction chamber with a coating of the invention, as used in a micro-component assembly.

FIG. 2 illustrates a section of a wavyplate or separator in a micro-component heat exchanger processed in accordance with the invention. In the figure, a sinusoidal shaped waveplate 20 has two opposite sides 21 and 22, respectively exposed to laminar fluid flows A and B in a heat exchanger assembly such as described in United States application for U.S. Pat. No. 09/627,267 referenced above. In an example, one side 21 of the wavyplate is coated in accordance with the process herein with a catalyst material 23 to promote the steam reforming reaction in fluid flow A that may be generally characterized as: Hydrocarbon Fuel+$H_2O \rightarrow H_2$+$CO_2$+$H_2O$+CO. Maintenance of the steam reforming reaction requires that heat be input into the exchanger. The sustained 700° C. heat for the catalytic reaction is provided by an exothermic reaction in fluid flow B of a mixture of combustible materials, such as fuel cell off gas and/or gasoline in a mixture with air on the opposite side 21 of the wavyplate. Centerpoints of the sections (top to top) of the wavyplate are approximately 3.0 millimeters apart.

In a general description, the invention is a method for enhancing the surface area and porosity properties of a substrate. Particles of a material capable of forming (by pyrolytic decomposition or thermal reaction) a metal oxide, such as hydroxide, carbonate or nitrate compounds of transition metals and rare earth metals, are thermally sprayed directly onto the surface of the substrate. The particles sprayed form a metal oxide and bond as a coating onto the substrate surface. The bonding mechanism includes mechanical bonding of the coating to the substrate. The coating effected by the thermal spray treatment is a catalyst itself, or may in turn be coated with a further catalytic material such as a noble metal.

Figure 1A:
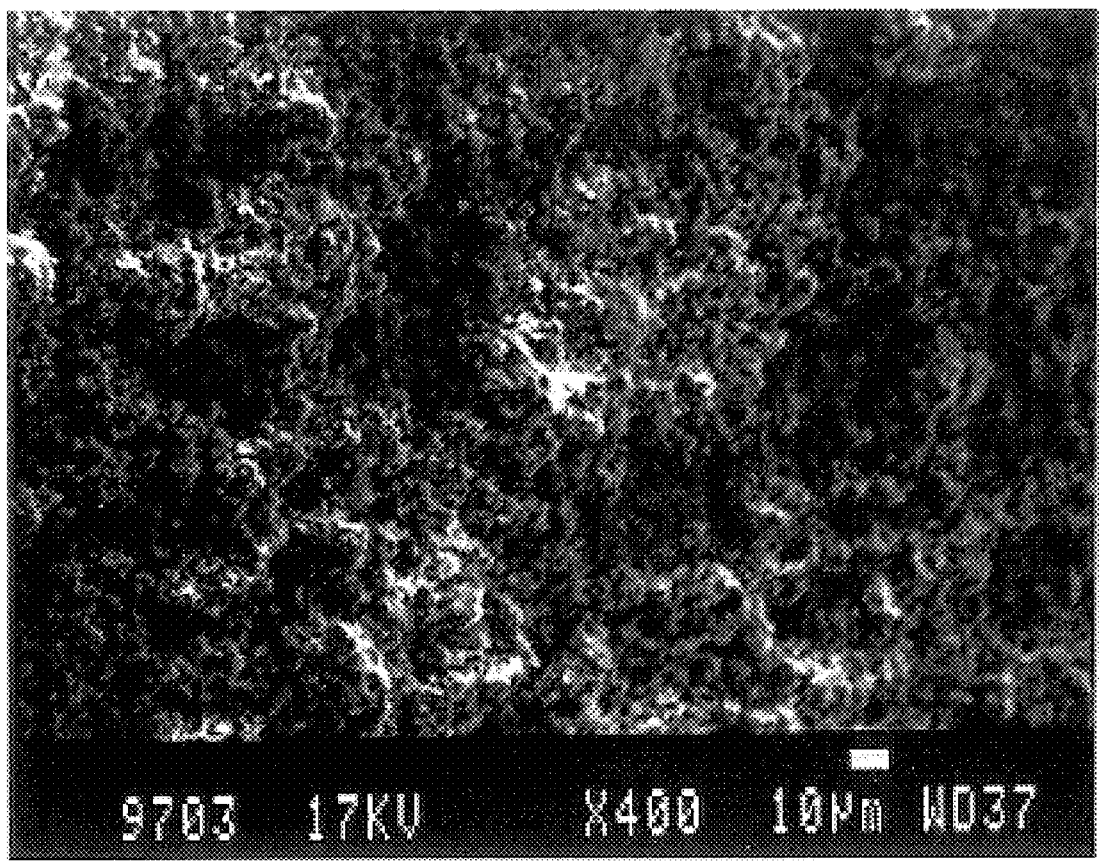
FIG. 1A is a 400× magnified view of the surface of a metal substrate coated with alumina.
Figure 1B:
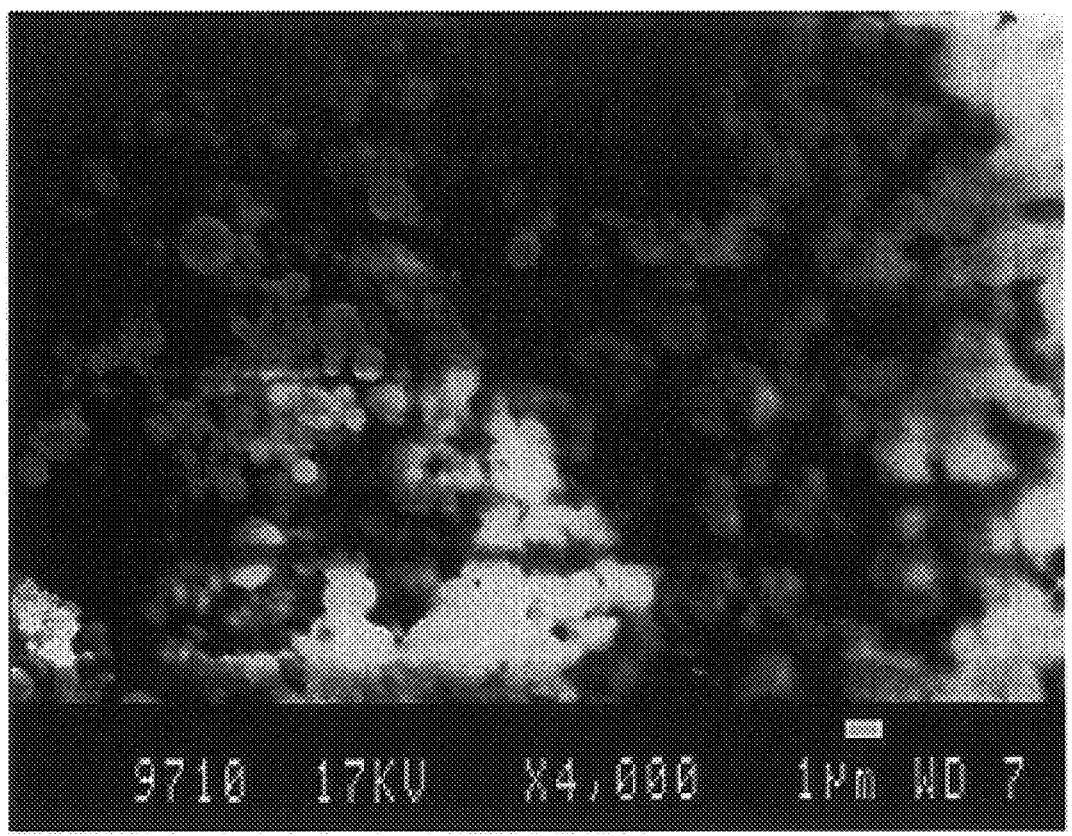
FIG. 1B is a 4000× magnified view of the surface of a metal substrate coated with alumina shown in FIG. 1A.

The thermally sprayed material is selected from the group comprising metal hydroxides, metal carbonates, and metal nitrates, and, in an example is an Al(OH)$_3$ powder that decomposes to Al$_2$O$_3$ having particle sizes on the substrate surface in the nominal size distribution range of approximately less than 1 micron to approximately 3 microns. The photomicrographs of FIGS. 1A and 1B illustrate a metal surface coated with Al$_2$O$_3$ particles deposited in accordance with the method and process of the invention. In FIG. 1B a metal surface is coated with Al$_2$O$_3$ particles in which 90% of the particles are less that 1 micron in size and 10% of the particles are in the size range between 1 micron and 3 microns. It is understood that the range stated is approximate and may vary, although the preferred object of the invention is a substrate surface coated with particles in a size, or sizes within the range noted. The surface to be coated may be treated before spraying, for example, by grit blasting.

The invention finds use in the production of micro-component assemblies used as heat exchangers or reaction chambers in various chemical reaction processes. Coatings produced by the invention are adaptable to separator elements used in such assemblies where separate fluid flows pass on opposite sides of a separator. So Micro-component assemblies thus treated are intended to be within the scope of the present invention.

The method is particularly useful, for example, as applied to a separator in a micro-component heat exchanger having micro-channels for the promotion of chemical reactions in fluid flows through the device, such as that disclosed and described in the previously referenced application for patent Ser. No. 09/627,267, in which catalytic or steam reformer reaction chambers are provided on one or both sides of a separator in a heat exchanger.

In examples, metal alloy substrates, such as a plate or foil shim with thicknesses of approximately 60 micrometers, 100 micrometers, or more are cleaned and prepared for surface treatment, for example, by washing in trichloroethylene and ethanol and rinsing with deionized water. The surface may be grit blasted to increase roughness to a range of about 5 micrometers.

The coating is formed on the cleaned substrate by thermally spraying powders that are catalyst precursors directly onto the substrate by thermal spraying processes known in the art. Flame spraying and plasma spraying are species of thermal spraying. In a preferred embodiment, the catalyst precursor coating material is applied by thermal spraying a powder onto a substrate. During the spraying process, most Al(OH)$_3$ will decompose into small particles of Al$_2$O$_3$. Al(OH)$_3$ has a lower melting temperature than Al$_2$O$_3$, hence, Al(OH)$_3$ requires a lower flame temperature, a benefit in the treatment of a thin shim. The lower the substrate temperature, the more porous (greater surface area and smaller particle size at the surface) the coating will be. In plasma spraying, for example, a temperature in the order of 30,000° C. may exist in the plasma, however, the peripheral regions of the spray where pyrolysis of the introduced powder occurs involve reaction temperatures in the range of approximately 2,000° C. to approximately 2400° C. Specific temperatures that will induce the pyrolytic decomposition reaction of the invention are dependent on particle size of the introduced powder, its composition, the rate of introduction, and the porosity characteristics of the substrate (i.e., particle sizes on the substrate) ultimately desired after treatment.

A further consideration of using Al(OH)$_3$ is that the phase transition after deposition of the coating on the surface during the cooling process is a transition from α to γ phase. This transition prevents the formation of large crystalline clusters on the surface. Overall, by introducing Al(OH)$_3$ powder into the thermal spray, porous γ—Al$_2$O$_3$ surface coatings are produced with particle size smaller than approximately 3 micrometers, as a result of the decomposition process during coating, 2Al(OH)$_3$→Al$_2$O$_3$+3H$_2$O.

The flame temperature or plasma power required to achieve sufficient mechanical bonding of the catalyst precursor material to the substrate varies depending on the specific catalyst precursor material used. The appropriate temperature/power is material dependent, but should be sufficient for pyrolysis of the sprayed material. In alternative embodiments, a catalyst coating may be formed on the substrate by using any catalyst precursor that decomposes to a metal oxide (pyrolysis process), including but not limited to metal hydroxides, metal carbonates, and metal nitrates. The pyrolytic decomposition of such materials may be represented by the formulas:

| For a metal hydroxide: | $Me(OH)_x \rightarrow MeO_x + H_2O$ |
| For a metal carbonate: | $Me(CO_3)_x \rightarrow MeO_x + CO_2$ |
| For a nitrate: | $Me(NO_3)_x \rightarrow MeO_x + N_2O$ |

The pyrolysis of a metal hydroxide catalyst precursor material to a catalyst coating may be represented by the equation: 2Al(OH)$_3$→Al$_2$O$_3$+3H$_2$O. The catalyst precursor material is heated by the flame or plasma of the thermal spray process and decomposes to a metal oxide en route to the substrate forming a metal oxide catalyst coating.

The hydroxide, carbonate, or nitrate powders or particles used provide a large size precursor to produce a coating of small size particles. While useful particle or powder sizes are not limited in the invention, the normal size distributions for particles or powders sprayed in the invention are in the range of nominally greater than 10 micrometers, and range from approximately 15 micrometers up to approximately 200 micrometers. As illustrated in the following example, a coating of catalytic material applied to a substrate will exhibit small particle size and high surface area characteristics particularly useful with micro-channel micro-component assemblies.

EXAMPLE I

A substrate (a 5 centimeter by 10 centimeter shim) of a stainless steel alloy, Iconel® 625, with a thickness of approximately 100 micrometers, was cleaned by washing with trichloroethylene for approximately 30 minutes and ethanol for another approximately 30 minutes and then soaked in deionized water for approximately 60 minutes in an ultrasonic cleaner.

The surface of the cleaned shim was enhanced by grit blasting using alumina particles of approximately 220 mesh size to obtain a roughness of several micrometers.

The treated substrate was coated with alumina by spraying aluminum hydroxide powder of nominal average particle size of about, but generally larger than, 15 micrometers in a plasma stream to provide a coating on the substrate surface having a thickness of about 10 micrometers. The coating presented a γ—Al$_2$O$_3$ catalyst material determined by XRD with low density and high porosity and surface area with particle size on a micrometer to sub-micrometer scale in the distribution. This process and materials of the Example provide a surface enhancement of 100 to 200 times as determined by BET.

Having described the invention in detail, those skilled in the art will appreciate that, given the present disclosure, modifications may be made to the invention without departing from the spirit of the inventive concept herein described. Rather, it is intended that the scope of the invention be determined by the appended claims.

I claim:

1. A method for providing a mechanically bonded layer of metal oxide particles having a particle size distribution in the nominal distribution range of less than approximately 5 microns to the surface of a metal substrate comprising:

thermally spraying a homogenous particle composition selected from the group consisting of metal hydroxide, metal carbonate, metal nitrate, transition metal hydroxide, transition metal carbonate, transition metal nitrate, rare earth metal hydroxide, rare earth metal carbonate, and rare earth metal nitrate particles, directly onto the surface of the metal substrate.

2. A method for providing a mechanically bonded layer of metal oxide particles having a particle size distribution in the nominal distribution range of less than approximately 5 microns to the surface of a metal substrate comprising:

plasma spraying a homogenous particle composition selected from the group consisting of metal hydroxide, metal carbonate, metal nitrate, transition metal hydroxide, transition metal carbonate, transition metal nitrate, rare earth metal hydroxide, rare earth metal carbonate, and rare earth metal nitrate particles, directly onto the surface of the metal substrate.

3. A method for providing a mechanically bonded layer of metal oxide particles having a particle size distribution in the nominal distribution range of less than approximately 5 microns to the surface of a metal substrate comprising:

flame spraying a homogenous particle composition selected from the group consisting of metal hydroxide, metal carbonate, metal nitrate, transition metal hydroxide, transition metal carbonate, transition metal nitrate, rare earth metal hydroxide, rare earth metal carbonate, and rare earth metal nitrate particles, directly onto the surface of the metal substrate.

4. The method of claim 1 or claim 2 or claim 3 in which a noble metal catalyst is deposited on the layer of metal oxide particles on the surface of the substrate after the spraying.

5. The method of claim 1 or claim 2 or claim 3 wherein the material sprayed is an $Al(OH)_3$ powder that decomposes to a surface layer of $Al_2O_3$ particles.

6. The method of claim 1 or claim 2 or claim 3 further comprising treating the substrate surface to improve adhesion of the material sprayed onto the surface before the spraying process.

7. The method of claim 6 wherein the treating comprises grit blasting the surface.

8. The method of claim 1 or claim 2 or claim 3 in which the metal oxide particles on the surface have a particle size distribution in the nominal distribution range of from about approximately less than 3 microns to about approximately less than 1 micron.

9. The method of claim 1 or claim 2 or claim 3 in which the material sprayed is a powder comprising a catalyst precursor that decomposes to a metal oxide by pyrolosis en route to the substrate.

10. The method of claim 1 or claim 2 or claim 3 in which the material sprayed is a particulate having a particle size distribution in the nominal distribution range of from about approximately 10 micrometers to about approximately 200 micrometers.

* * * * *